April 1, 1930.                R. C. LIVESAY                1,752,993
                    SCRAPER FOR HARVESTER MAIN WHEELS
                  Filed March 25, 1927        2 Sheets-Sheet 1
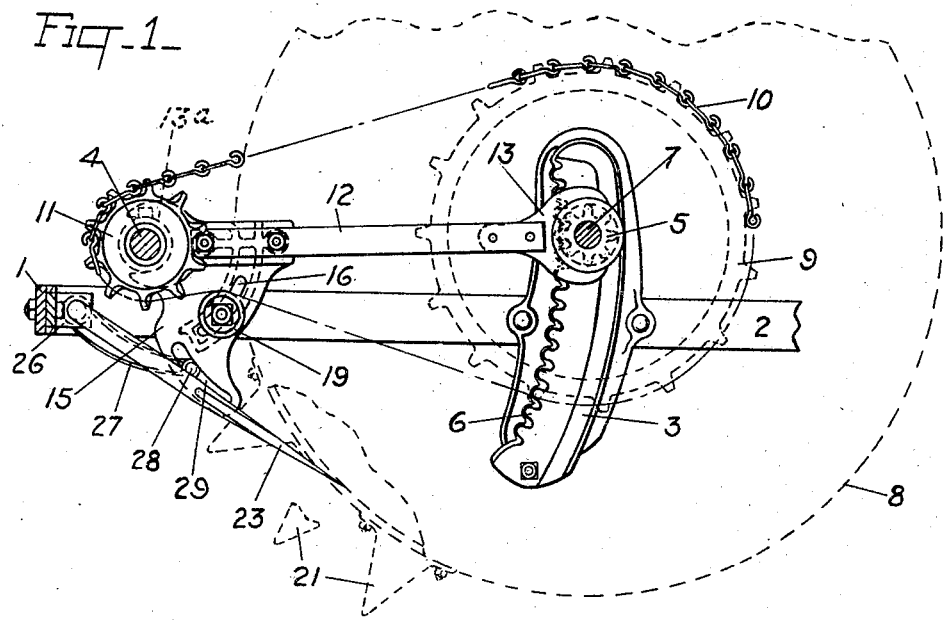
Fig_1_
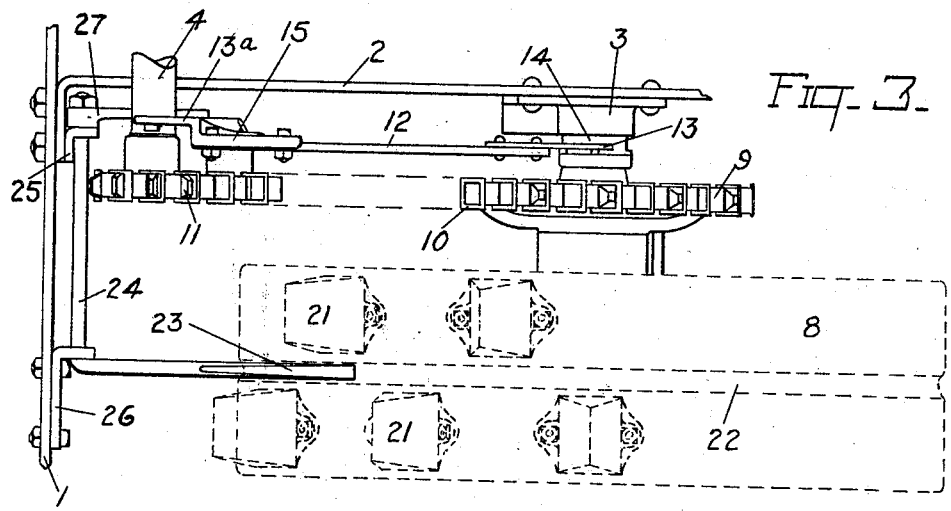
Fig_3_
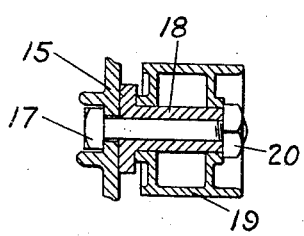
Fig_4_
Witness
a.D.McLeay
Inventor;
ROBERT C. LIVESAY
by W.C. Jirdinstone
Attorney

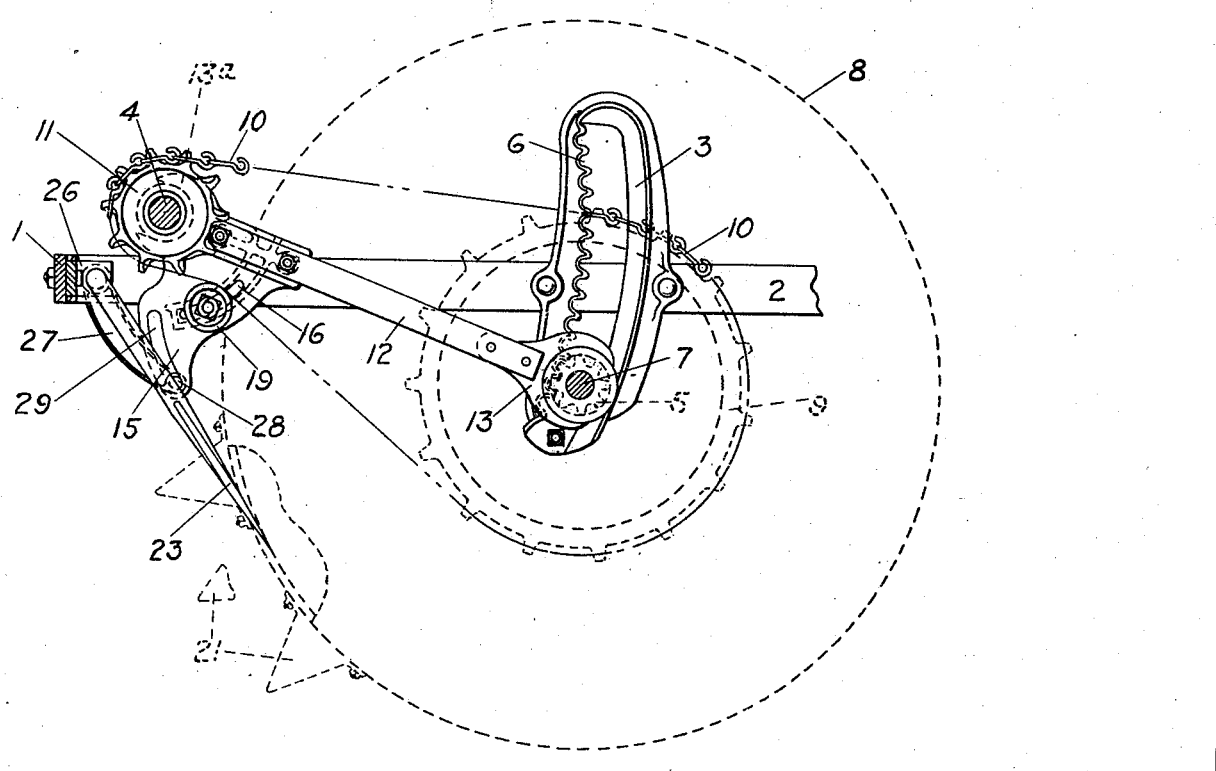

Patented Apr. 1, 1930

1,752,993

UNITED STATES PATENT OFFICE

ROBERT C. LIVESAY, OF MOLINE, ILLINOIS, ASSIGNOR TO DEERE & COMPANY, OF MOLINE, ILLINOIS, A CORPORATION OF ILLINOIS

SCRAPER FOR HARVESTER MAIN WHEELS

Application filed March 25, 1927. Serial No. 178,288.

My invention relates to scrapers, particularly as applied to the main wheel of grain harvesters and binders, and has for an object production of such a device in which the scraper is constantly in effective operative position irrespective of adjustment of the harvester frame on which it is mounted. Other objects will be apparent in the following specification.

Referring to the drawings in which similar numerals indicate identical parts.

Figure 1 is a side elevation, in part, of the main frame of a harvester binder and the main wheel in approximately normal operating position, and illustrating the application of my invention, the main wheel and main sprocket being shown in dotted lines.

Figure 2 is a view similar to Figure 1, but with the parts in position when the main frame is raised.

Figure 3 is a plan view of Figure 1, and

Figure 4 is an enlarged detail of the tension roller and support.

The means commonly employed to adjust the main frame of a harvester and binder are well known in the art, and it is believed sufficient of the mechanism has been shown to illustrate the application and relation of my device thereto. The part of the main frame shown consists of the rear bar 1 and a transverse bar 2 bolted together. Preferably riveted on the bar 2 is the sector 3, of the usual type, with notches 6 and arranged concentric with the power shaft 4. A spur gear 5 is rigidly secured on the axle 7 of the main wheel 8, shown in dotted lines, and meshes with the notches 6. A sprocket 9 is secured to the hub of the main wheel 8, which is revolubly mounted on the axle 5, and over it leads the chain 10, shown partly in full lines, to a sprocket 11 rigidly secured on the shaft 4. The parts heretofore described are well known in the art and common to harvesters of this class.

Radial to the shaft 4 and axle 7 is a rockable element by the actuation of which the scraper 2 is controlled. It includes a bar 12, a bifurcated member 13, riveted to the bar 12 and embracing the hub 14 of the gear 5, and a vertically disposed member 15 extending downwardly from the bar 12, to which it is riveted, and having an integral bifurcated part 13ª, which clasps the shaft 4. Through a slot 16 in said member a bolt 17 extends and carries a stub axle 18 on which is journaled a tension roller for the chain 10.

The main wheel 8, shown in dotted lines, is provided with lugs 21 on its tread surface and between the lugs is a circumferential groove 22, in which a scraper blade 23 operates. The scraper includes the blade 23 and a part 24, bent at a right angle to the blade, rotatably journaled in bearings 25 and 26 bolted on the main frame. Secured on the end of the part 24 is an arm 27, extending forwardly toward the casting 15, on the free end of which is a pin 28 adapted to travel in a slot 29 in the casting 15.

In the operation of raising or lowering the main frame, the axle 7 on which the gear 5 is rigidly mounted is manually rotated, in a manner common to machines of this class; the rotation of the axle and gear raises the main frame by operation of the gear, in mesh with the notches in the sector 3 rigidly mounted on the frame, the sector rising with the frame, and as the frame rises, the rear of the bar 12 also rises, imparting a downwardly and rearwardly swinging movement, concentric to the axis of the shaft 4, to the member 15 secured to the bar 12. As the member 15 swings, the change of position of the slot 29 acting upon the pin 28 on the arm 27, swings the arm 27 downwardly and rearwardly, and by the connection of the latter to the part 24 of the scraper, the scraper is swung rearwardly, its point following the periphery of the wheel 8, as the frame rises, the slot 29 being so calculated that the point of the scraper retains substantially a fixed position relative to the tread surface of the wheel irrespective of the high or low adjustment of the frame. It is obvious that a reverse operation of the frame adjusting mechanism will lower the frame and also cause a reverse movement of the parts until the frame has been lowered to the desired position. But at all times the point of the scraper contacts lightly with the bottom of the groove 22 but with sufficient pressure to cleanly remove any adhering soil from the groove, and operates at the same time to break away any accumulation between the lugs 21. The pressure of the point of the scraper on the tread surface of the wheel is constant and never varies during the operation of raising or lowering of the frame.

What I claim is—

1. In a harvester, the combination of a frame adapted to be raised or lowered, means operable to raise or lower the frame, a main wheel, a scraper pivotally supported on the frame movable therewith and having its free end in fixed position relative to the tread surface of the wheel and contacting with said surface with unvarying pressure, and means operative to maintain said position and pressure irrespective of the raising or lowering of the frame.

2. In a harvester, the combination of a frame adapted to be raised or lowered means operable to raise or lower the frame, a main wheel, a scraper pivotally supported on the frame movable therewith and having its free end in fixed position relative to the tread surface of the wheel, means supported on the frame connected with the scraper and the raising and lowering means and operative to maintain said position irrespective of the raising or lowering of the frame.

3. In a harvester, the combination of a frame adapted to be raised or lowered, means operable to raise or lower the frame, a main wheel, a scraper pivotally supported on the frame movable therewith and having its free end in fixed position relative to the tread surface of the wheel, means pivotally supported on the frame connected with the raising and lowering means having a movable connection with the scraper and operative to maintain the position thereof relative to the tread surface of the wheel irrespective of the raising or lowering of the frame.

4. In a harvester, the combination of a frame adapted to be raised or lowered, means operable to raise or lower the frame, a main wheel, a scraper pivotally supported on the frame movable therewith and having its free end in fixed position relative to the tread surface of the wheel, a rockable element pivotally supported on the frame connected with the scraper and pivotally connected with the raising and lowering means, and actuated thereby to maintain the relative position of the free end of said scraper to the tread surface of the wheel irrespective of the raising or lowering of the frame.

5. In a harvester, the combination of a frame adapted to be raised or lowered, means operable to raise or lower the frame, a main wheel, a scraper pivotally supported on the frame movable therewith and having its free end in fixed position relative to the tread surface of the wheel, a rockable element pivotally supported on the frame and including a downwardly extending member connected with the scraper, said element being pivotally connected with the raising and lowering means and rockable thereby to maintain the relative position of the free end of the scraper to the tread surface of the wheel irrespective of the vertical movement of the frame.

6. In a harvester, the combination of a frame adapted to be raised or lowered, means operable to raise or lower the frame, a main wheel, a scraper including a blade having its free end in a fixed position relative to the tread surface of the wheel, a part of said scraper at a rght angle to the blade and turnably supported on the frame, an arm on said part extending substantially in parallelism with the blade, a rockable element pivotally supported on the frame connected with the raising and lowering means and including a downwardly extending member having a sliding connection with said arm and actuated by raising or lowering the frame, and operating to maintain said position of the scraper irrespective of the vertical movement of the frame.

7. In a harvester, the combination of a frame adapted to be raised or lowered, means operable to raise or lower the frame, a main wheel, a scraper including a blade having its free end in a fixed position relative to the tread surface of the wheel, a part of said scraper at a right angle to the blade and turnably supported on the frame, an arm on said part extending substantially in parallelism with the blade, a rockable element pivotally supported rearwardly on the frame extending forwardly to connection with the raising and lowering mechanism, said element including a downwardly extending member having a slot adjacent its lower end, and a pin on said arm engaging with the slot and movable therein as the frame is raised or lowered, and operating to maintain the position of the scraper relative to the tread surface of the wheel irrespective of the raising or lowering of the frame.

8. In a harvester, the combination of a main wheel, a frame supported thereon and adapted to be raised or lowered, means operable to raise or lower the frame, a scraper supported on the frame and means actuable by raising or lowering the frame to hold said scraper against the tread surface of the wheel with substantially unvarying pressure irrespective of the raising or lowering of the frame.

ROBERT C. LIVESAY.